(12) United States Patent
Sakakibara et al.

(10) Patent No.: US 9,709,866 B1
(45) Date of Patent: Jul. 18, 2017

(54) LIQUID CRYSTAL DISPLAY DEVICE

(71) Applicant: Panasonic Liquid Crystal Display Co., Ltd., Himeji-shi, Hyogo (JP)

(72) Inventors: Tatsuhito Sakakibara, Hyogo (JP); Ryutaro Oke, Hyogo (JP); Daisuke Kajita, Hyogo (JP)

(73) Assignee: Panasonic Liquid Crystal Display Co., Ltd., Hyogo (JP)

( * ) Notice: Subject to any disclaimer, the term of this patent is extended or adjusted under 35 U.S.C. 154(b) by 0 days.

(21) Appl. No.: 15/085,591

(22) Filed: Mar. 30, 2016

(51) Int. Cl.
*G02F 1/1362* (2006.01)
*G02F 1/1343* (2006.01)

(52) U.S. Cl.
CPC .. *G02F 1/136286* (2013.01); *G02F 1/134309* (2013.01); *G02F 2001/134345* (2013.01)

(58) Field of Classification Search
CPC .. G02F 1/1343; G02F 1/134363; G02F 1/136; G02F 1/136286; G02F 1/1335; G02F 1/133514; G02F 1/133512; G02F 1/1368; G02F 1/133707; G02F 1/134309; G02F 1/1362; G02F 1/1333; G02F 1/133345; G02F 1/136209; G02F 1/133711; G02F 1/134336; G02F 2001/134372; G02F 2001/134345; G02F 2001/133357; G02F 2201/40; G02F 2201/52; H01L 27/124; H01L 27/3211; H01L 27/3244; H01L 27/3262; H01L 27/3276; H01L 29/41733; G09G 3/3648; G09G 2300/0426

USPC ........ 345/92, 87, 88, 55; 349/106, 139, 138, 349/141, 143, 43, 144, 192, 108, 110
See application file for complete search history.

(56) References Cited

U.S. PATENT DOCUMENTS

| 7,663,724 B2 | 2/2010 | Lim et al. |
| 9,104,078 B2 | 8/2015 | Kajita |
| 2010/0001939 A1 | 1/2010 | Ochiai et al. |
| 2016/0266450 A1* | 9/2016 | Kim .................. G02F 1/133514 |

* cited by examiner

*Primary Examiner* — Thoi Duong
(74) *Attorney, Agent, or Firm* — Hamre, Schumann, Mueller & Larson, P.C.

(57) ABSTRACT

A liquid crystal display is provided that includes a first substrate on a back surface side, a second substrate on a display surface side and a liquid crystal layer provided between the first and second substrates. The display also includes a plurality of sub-pixels including one or more green sub-pixels and one or more non-green sub-pixels. The first substrate includes first and second wirings provided at the boundary between adjacent sub-pixels. When a green sub-pixel is adjacent to a non-green sub-pixel, the first wiring is provided at a shifted position that is closer to the non-green sub-pixel than the green sub-pixel. Accordingly, when a non-green image is to be displayed, the display can reduce the amount of color mixing of light passing through a green color filter with the light passing through a non-green color filter, particularly when the display is viewed at oblique angles.

6 Claims, 6 Drawing Sheets

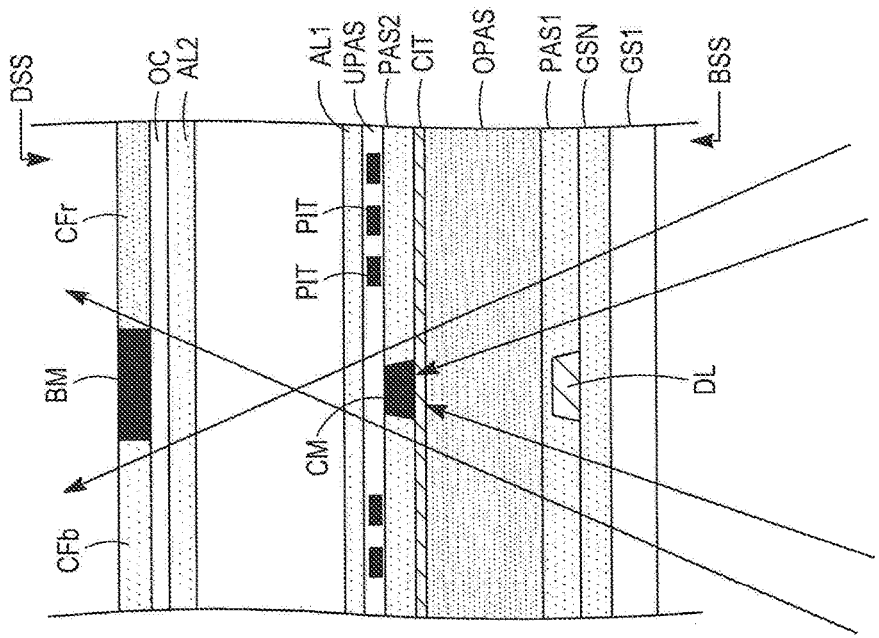
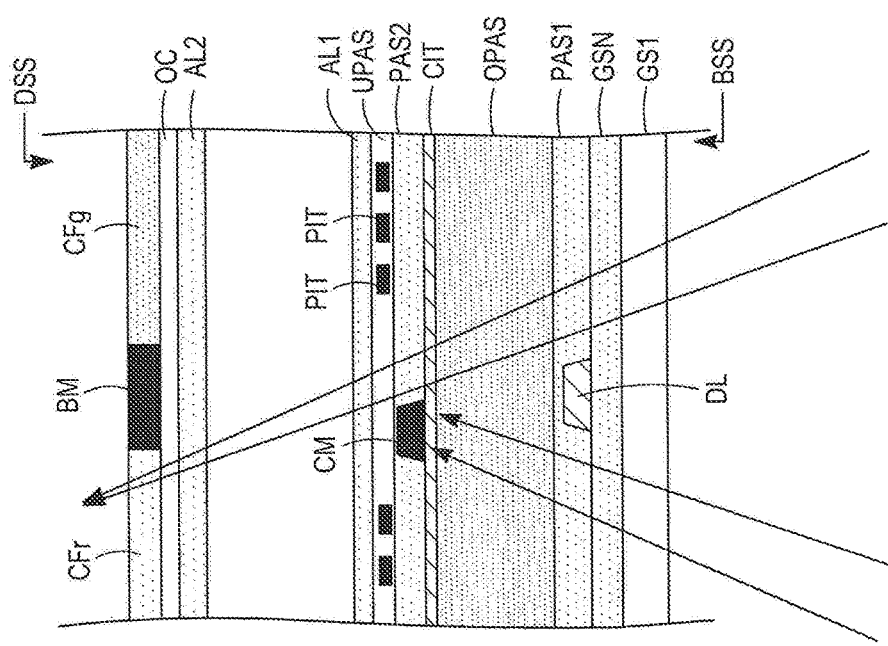
FIG. 6B
FIG. 6A

LIQUID CRYSTAL DISPLAY DEVICE

FIELD

The embodiments described herein are directed to a liquid crystal display device. More particularly, the embodiments described herein relate to a liquid crystal display device with reduced color mixture and an increased aperture ratio.

BACKGROUND

A liquid crystal display generally includes a thin film transistor substrate (hereinafter referred to as "TFT substrate") located on a back surface side, a color filter substrate (hereinafter referred to as "CF substrate") located on a front surface side (display surface side) and opposed to the TFT substrate, and a liquid crystal layer sandwiched between the TFT substrate and the CF substrate. Color filters for different colors (for example, red color, green color, and blue color) and a light shielding portion (hereinafter referred to as "black matrix") located at a boundary between the respective color filters are formed in the CF substrate.

SUMMARY

The embodiments described herein are directed to a liquid crystal display device. More particularly, the embodiments described herein relate to a liquid crystal display device with reduced color mixture and an increased aperture ratio.

For liquid crystal display devices, an occurrence of color mixture can deteriorate the quality of the image. Color mixture is a blending of colors which results in the visual color display being deteriorated and/or distorted, particularly in a case where a line of sight of a retina of a viewer's eye is in a diagonal direction relative to the liquid crystal display device. Color mixture can be the result of a leaking of light from adjacent sub-pixel regions, a viewing angle of a viewer, and/or the nature of the human eye. For example, a red pixel can exhibit a color tint mixed with another color (e.g., green color, blue color, etc.) when viewed diagonally, thereby deteriorating the display quality of the liquid crystal display device. Black matrices can be used to prevent some of this color mixing by shielding light passing through undesired color filters when viewed by a human at oblique angles. Increasing the size of the black matrix can reduce the amount color mixing that can be viewed. However, increasing the size of the black matrix has been found to reduce the aperture ratio of the liquid crystal display device, and thereby also lead to low luminescence and/or consume large electricity of the liquid crystal display device.

It has been found that the retina of a human eye is more insensitive to color mixing with the green color than in other colors (e.g., blue color, red color, etc.). That is, the retina of a human eye can be more highly resistant to color mixture in the green color than in other colors (e.g., blue color, red color, etc.). In other words, when an image of green light mixed with a slight amount of another color light is displayed, the retina of a human eye cannot easily sense the color mixture. On the other hand, when an image of either red light or blue light mixed with a slight amount of another color light is displayed, the retina of the human eye can more easily sense the color mixture. The embodiments described herein can reduce color mixing of a non-green light with another color light when the non-green color image is to be displayed. The embodiments described herein can prevent this color mixing properly without increasing the size of black matrices provided between adjacent color filters which can reduce the aperture ratio of the liquid crystal display device. Accordingly, color mixing can be reduced without sacrificing the aperture ratio of the liquid crystal display device.

The embodiments described herein provide a liquid crystal display that includes a first substrate on a back surface side, a second substrate on a display surface side and a liquid crystal layer provided between the first and second substrates. The display also includes a plurality of sub-pixels including one or more green sub-pixels and one or more non-green sub-pixels. The first substrate includes first and second wirings provided at the boundary between adjacent sub-pixels. When a green sub-pixel is adjacent to a non-green sub-pixel, the first wiring is provided at a shifted position that is closer to the non-green sub-pixel than the green sub-pixel. Accordingly, when a non-green image is to be displayed, the display can reduce the amount of color mixing of light passing through a green color filter with the light passing through a non-green color filter, particularly when the display is viewed at oblique angles.

In one embodiment, a liquid crystal display is provided that includes a first substrate, a second substrate, a liquid crystal layer and a plurality of sub-pixels. The first substrate is provided on a back surface side and includes a plurality of first wirings and a plurality of second wirings extending in a same direction. The second substrate is provided on a display surface side. The first substrate and the second substrate are opposed to each other. The liquid crystal layer is provided between the first substrate and the second substrate. The plurality of sub-pixels includes one or more green sub-pixels and one or more non-green sub-pixels. A boundary between two adjacent sub-pixels of the plurality of sub-pixels is defined by a corresponding second wiring of the plurality of second wirings. A corresponding first wiring of the plurality of first wirings is provided at the boundary between the two adjacent sub-pixels. A first gap defines a shortest distance from a centerline, extending from the first substrate to the second substrate, of a corresponding first wiring separating a green sub-pixel and an adjacent non-green sub-pixel to a centerline, extending from the first substrate to the second substrate, of a corresponding second wiring separating the green sub-pixel and the adjacent non-green sub-pixel. A second gap defines a shortest distance from a centerline, extending from the first substrate to the second substrate, of a corresponding first wiring separating a first non-green sub-pixel and an adjacent second non-green sub-pixel to a centerline, extending from the first substrate to the second substrate, of a corresponding second wiring separating the first non-green sub-pixel and the adjacent second non-green sub-pixel. The first gap is greater than the second gap. Also, the centerline of the corresponding first wiring separating the green sub-pixel and the adjacent non-green sub-pixel is closer to a centerline of the non-green sub-pixel than to a centerline of the adjacent green sub-pixel. Further, the plurality of first wirings is provided between the plurality of second wirings and the second substrate.

BRIEF DESCRIPTION OF THE DRAWINGS

References are made to the accompanying drawings that form a part of this disclosure, and which illustrate embodiments in which the systems and methods described in this specification can be practiced.

FIGS. 6A and 6B illustrate simplified schematics of how light can be transmitted through a portion of a display region, according to one embodiment.

Like reference numbers represent like parts throughout.

DETAILED DESCRIPTION

A liquid crystal display device applies light modulating properties of liquid crystals to display high quality images across a screen for visual viewing. An LCD display may be composed of red, blue, and green sub-pixels, the light from which combine/add in various proportions to produce all other colors as well as white and shades of gray. The embodiments described herein relate to a liquid crystal display device that can prevent deterioration of image quality by color mixing and can increase an aperture ratio of the liquid crystal display device.

It has been found that the human eye is more insensitive to color mixing with the green color than in other colors (e.g., blue color, red color, etc.). The embodiments described herein can prevent deterioration of image quality by color mixing of non-green light with another color light when the non-green color image is to be displayed. The embodiments described herein can prevent deterioration of image quality by this color mixing without increasing the size of black matrices provided between adjacent color filters. Increasing the size of the black matrices can reduce the aperture ratio of the liquid crystal display device. Accordingly, deterioration of image quality by color mixing can be reduced without sacrificing the aperture ratio of the liquid crystal display device.

References are made to the accompanying drawings that form a part hereof, and in which is shown by way of illustration of the embodiments in which the methods and systems described herein may be practiced.

While the embodiments described herein are directed to a liquid crystal display device, it will be appreciated that the embodiments described herein are not limited to a liquid crystal display device.

Figure 1:
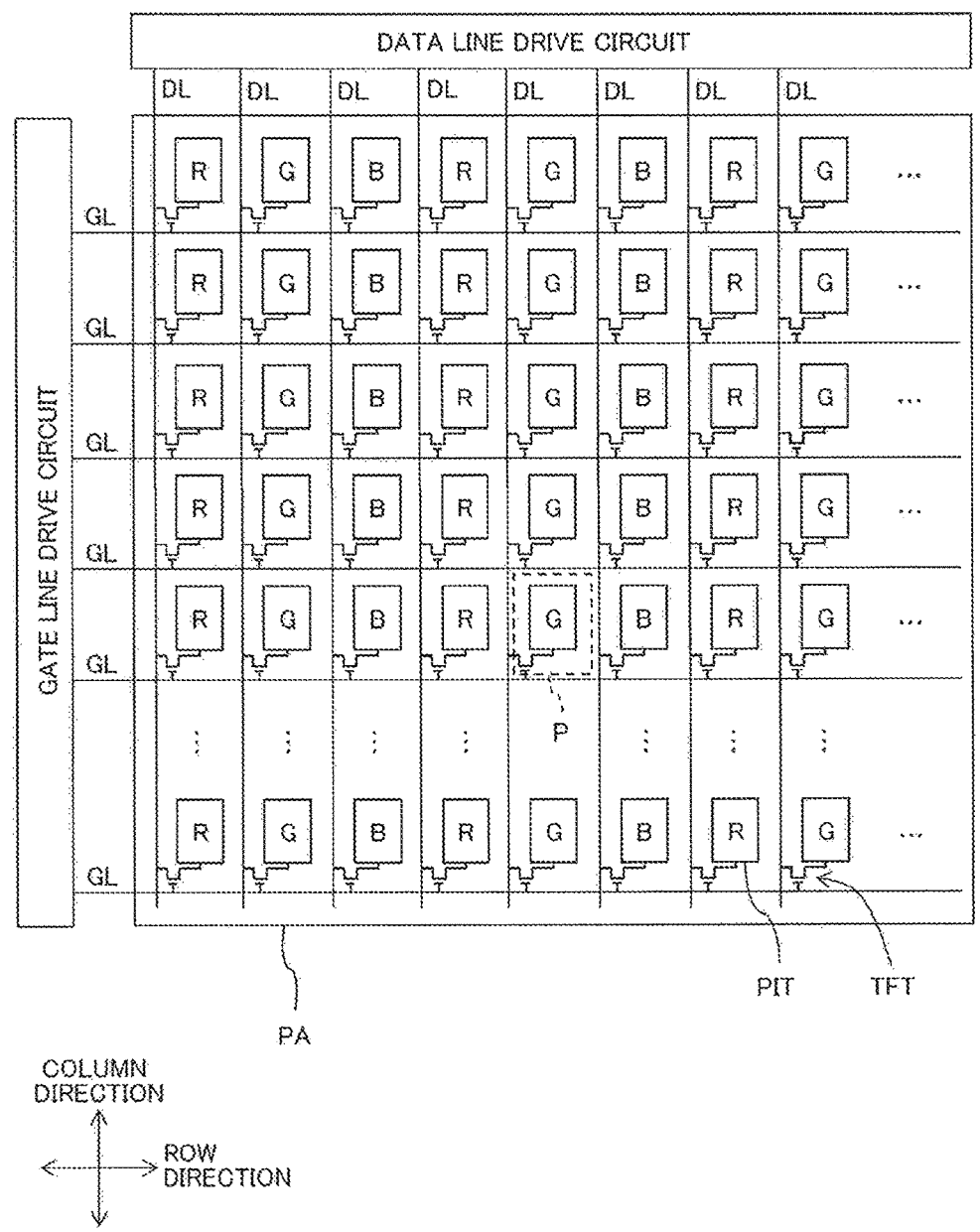
FIG. 1 illustrates a plan view of a configuration of a liquid crystal display device according to one embodiment.

FIG. 1 is a plan view illustrating an overall configuration of a liquid crystal display device according to one embodiment. The liquid crystal display device LCD1 includes a display region PA for displaying an image, a plurality of drive circuits (i.e., a data line drive circuit and a gate line drive circuit) for driving the display region PA, a control circuit (not shown) for controlling the data line drive circuit and the gate line drive circuit, and a backlight (not shown) for illuminating the display region PA with light from a back surface side. It will be appreciated that in some embodiments, the drive circuits may be mounted to the display region PA.

Figure 2:
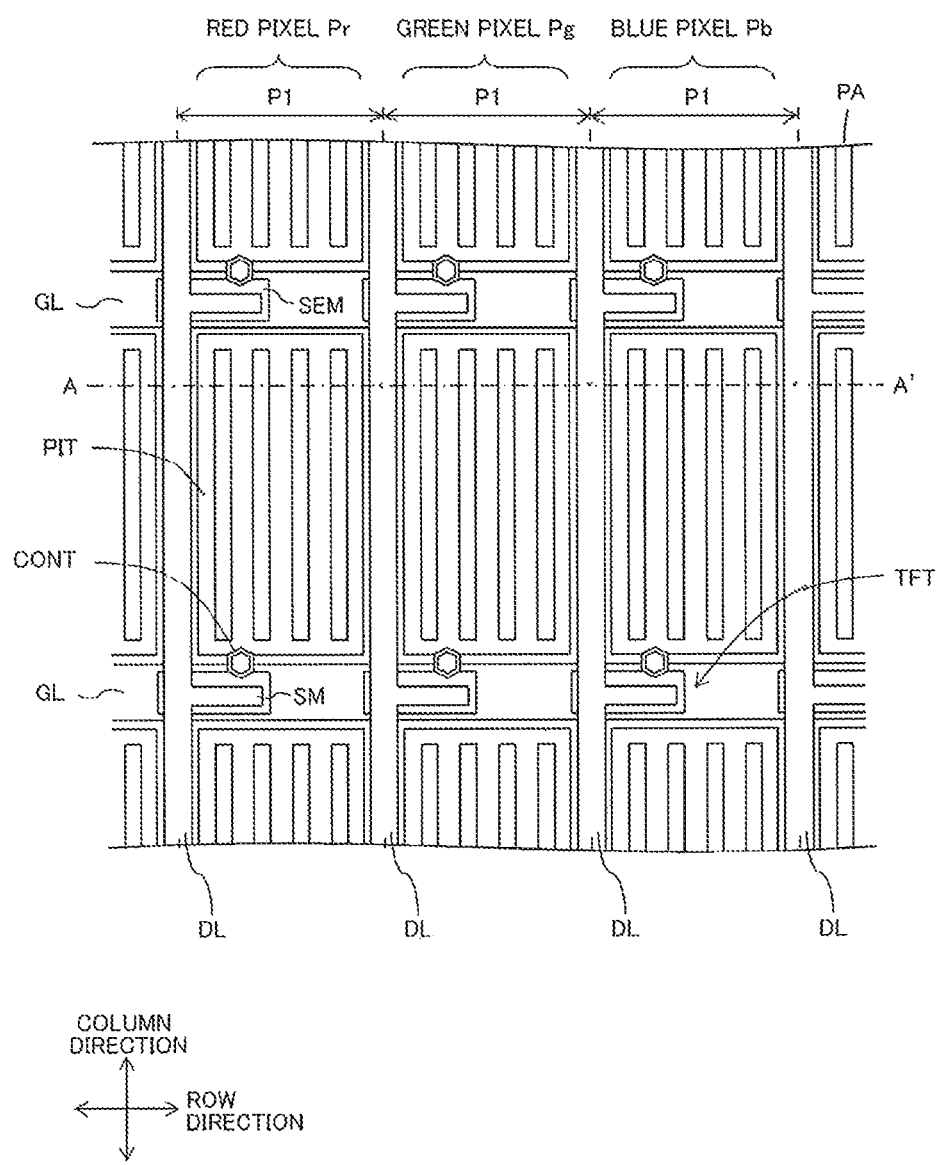
FIG. 2 illustrates a plan view of a part of the display region shown in FIG. 1.

FIG. 2 is a plan view illustrating a configuration of a part of the display region PA shown in FIG. 1. It is noted that, for the sake of convenience, FIG. 2 illustrates a state of a thin film transistor (TFT) substrate SUB2 viewed from the front surface side through a color filter substrate (hereinafter referred to as "CF substrate") SUB1 (see FIG. 3). A plurality of data lines DL and a plurality of gate lines GL are formed on the TFT substrate SUB2 so as to extend in a column direction and in a row direction respectively. A TFT is formed in a vicinity of each of a plurality of intersections between the plurality of data lines DL and the plurality of gate lines GL. A rectangular area surrounded by two adjacent data lines DL and two adjacent gate lines GL is defined herein as one sub-pixel P, and a plurality of the sub-pixels P are arranged in a matrix shape (in the row direction and the column direction). A pixel electrode PIT formed of a transparent conductive film of indium tin oxide (ITO) or the like is provided to each of the sub-pixels P. As illustrated in FIG. 2, each of the pixel electrodes PIT includes openings (for example, slits) to be formed to have a stripe shape. In the TFT, a semiconductor layer SEM formed of amorphous silicon (aSi) is formed on a gate insulating film (not shown), and a drain electrode (SM) and a source electrode (not shown) are formed on the semiconductor layer SEM. The drain electrode SM is electrically connected to the data line DL, and the source electrode is electrically connected to the pixel electrode PIT via a contact hole CONT. It is noted that the plurality of data lines DL are arrayed in the row direction at even intervals P1. A common electrode CIT (omitted for simplicity), formed of a transparent conductive film of indium tin oxide (ITO) or the like, is provided so as to expand on whole the display region PA. The common electrode CIT can overlap with the data lines DL and/or gate lines GL. In some embodiments, the common electrode may be formed in the color filter substrate. Also, in some embodiments, the common metal lines (not shown) can extend in the column direction and overlap with the data lines DL.

As illustrated in FIG. 2, the plurality of sub-pixels P include a red sub-pixel Pr corresponding to a red light transmission portion, a green sub-pixel Pg corresponding to a green light transmission portion, and a blue sub-pixel Pb corresponding to a blue light transmission portion. Further, the sub-pixels P are arrayed so as to correspond to an arrangement of the colored light transmission portions. The red sub-pixel Pr, the green sub-pixel Pg, and the blue sub-pixel Pb are arrayed in the row direction repetitiously, while the sub-pixels P of the same color are arrayed in the column direction.

Figure 3:
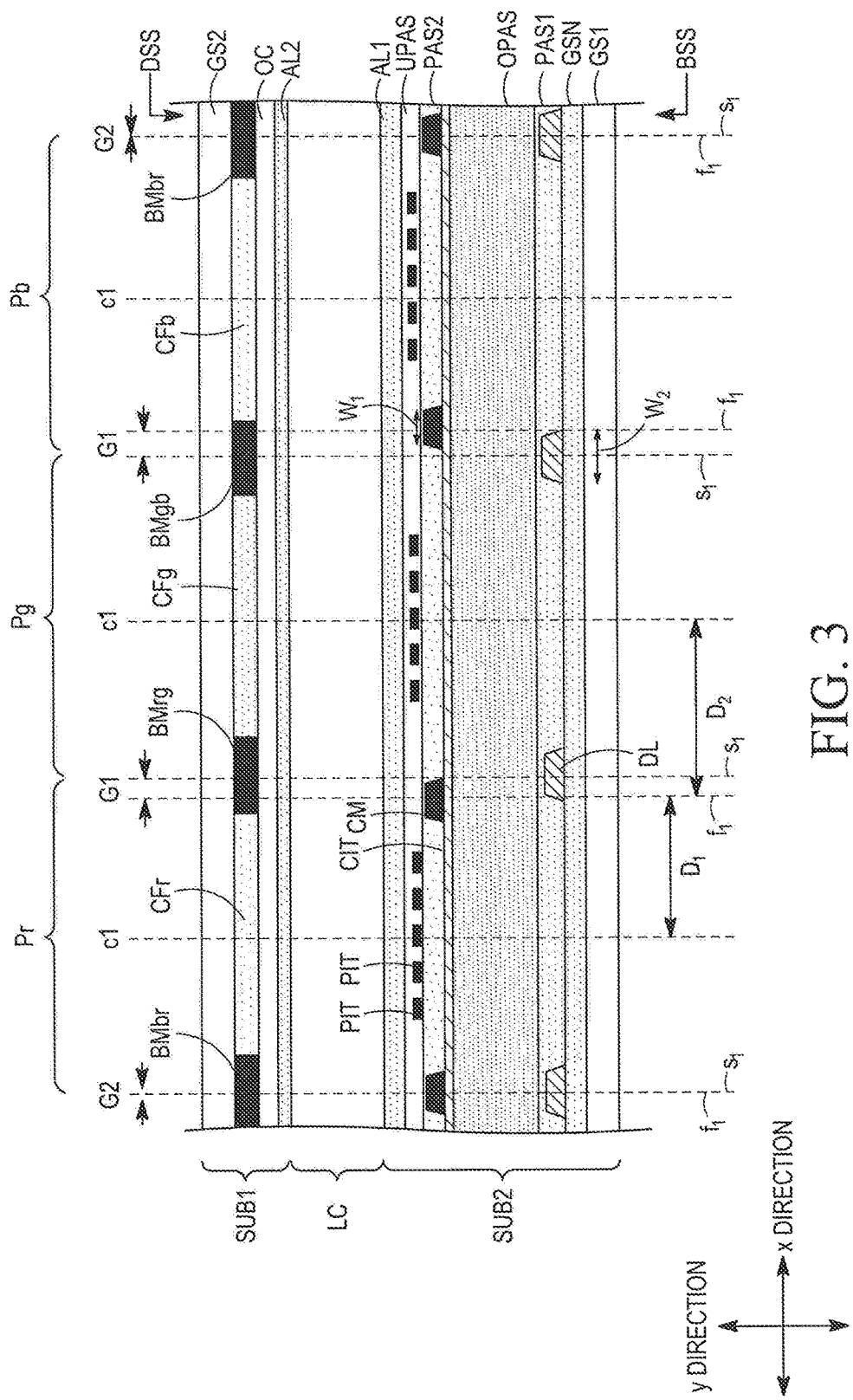
FIG. 3 illustrates a sectional view taken along the line A-A' of FIG. 2, according to a first embodiment.
Figure 4:
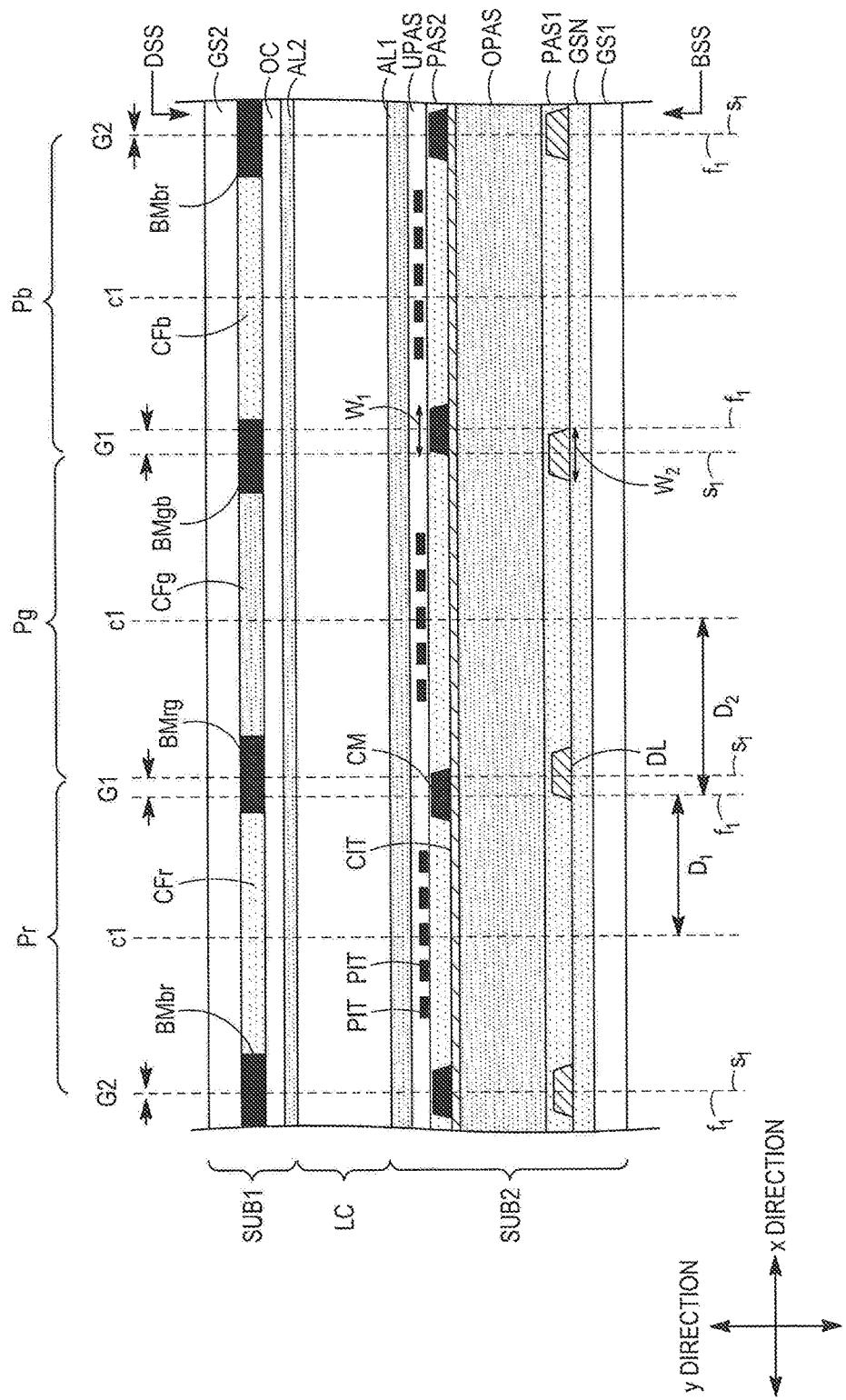
FIG. 4 illustrates a sectional view taken along the line A-A' of FIG. 2, according to a second embodiment.
Figure 5:
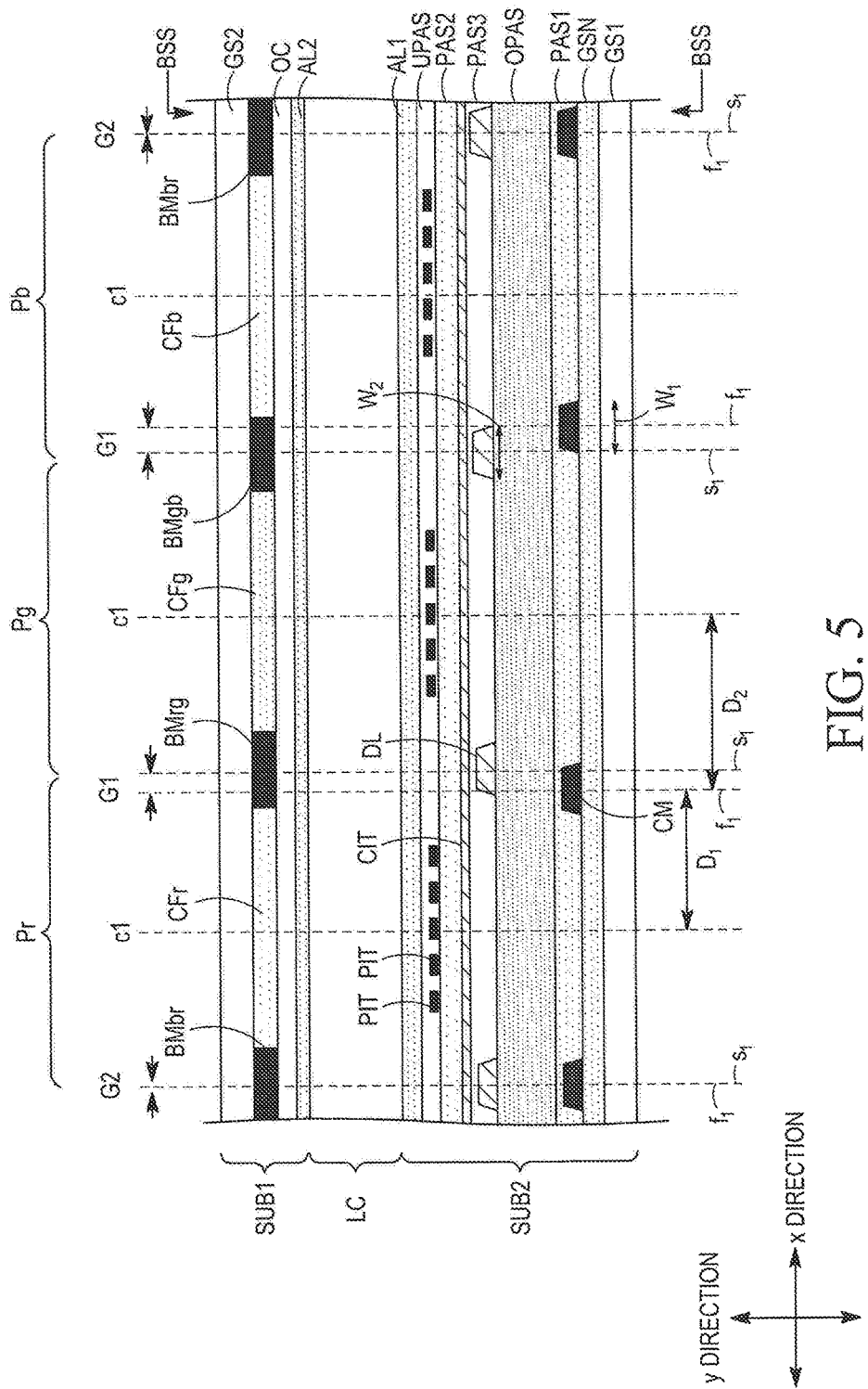
FIG. 5 illustrates a sectional view taken along the line A-A' of FIG. 2, according to a third embodiment.

FIGS. 3-5 are sectional views taken along the line A-A' of FIG. 2, according to three different embodiments. As illustrated in FIGS. 3-5, the display region PA includes the TFT substrate SUB2 located on a back surface side BSS, the CF substrate SUB1 located on a front surface side (display surface side) DSS and opposed to the TFT substrate SUB2, and a liquid crystal layer LC sandwiched between the TFT substrate SUB2 and the CF substrate SUB1. The TFT substrate SUB2, the liquid crystal layer LC and the CF substrate SUB1 are shared by the plurality of sub-pixels Pr, Pg, and Pb.

The TFT substrate SUB2 is a substrate assembly including a gate line (not shown), a gate insulator film GSN, a thin film transistor (TFT) including a semiconductor layer, a drain electrode SM and a source electrode, a first passivation film PAS1, an organic passivation layer OPAS, a common electrode CIT, a plurality of common metal lines CM, a second passivation film PAS2, a pixel electrode PIT, an upper passive layer UPAS, and a first alignment layer AL1 that is stacked on a first glass substrate GS1.

The gate line (see gate line GL in FIG. 2) is formed of, for example, a metallic material such as aluminum Al or copper Cu. The thickness of the gate line can be, for example, 100 to 300 nm. The gate insulator film GSN is formed on the upper portion of the gate line GL. The gate insulator film GSN can be formed of, for example, a silicon nitride SiN using, for example, a plasma chemical vapor deposition method (CVD). The gate insulator film GSN may also be formed of silicon dioxide $SiO_2$ or alumina $Al_2O_3$.

The semiconductor layer is processed into, for example, the shape of an island and is arranged above the gate line. The semiconductor layer material of the semiconductor layer can be formed of, for example, a combination of a silicon nitride SiN and an amorphous silicon a-Si, a combination of silicon dioxide $SiO_2$ and an oxide semiconductor, or a low-temperature poly-silicon LTPS. The oxide semiconductor can be formed of, for example, an oxide of indium-gallium-zinc or the like.

The plurality of data lines DL and the source electrode are formed at the end portions of the semiconductor layer. The plurality of data lines DL and the source electrode can be formed of, for example, a low-resistant metallic material. The metallic material can be, for example, a metallic material is such as aluminum Al or copper Cu. The first passivation film PAS1 is formed on the data line DL and the source electrode. The first passivation film PAS1 can be formed of, for example, a silicon nitride SiN or a silicon dioxide $SiO_2$. The first passivation film PAS1 has a thickness of, for example, 200 to 400 nm.

The organic passivation layer OPAS is formed of, for example, a photosensitive resistive material such as acrylic. The organic passivation layer OPAS has a thickness of, for example, 3 micro meters, and is formed to be thicker than the other inorganic insulating layers.

As illustrated in FIGS. 3, 4 and 5, there are overlapping electrode portions on the opposing faces of the common electrode CIT and the pixel electrode PIT, which together sandwich the second passivation film PAS2 there between. Openings (slits) are formed in the pixel electrode PIT. The first alignment layer AL1, used for aligning liquid crystal molecules of the liquid crystal layer LC, is formed between the liquid crystal layer LC and the electrode layer of the common electrode CIT and the pixel electrode PIT.

The pixel electrode PIT and the common electrode CIT constitute an electrode portion for forming the fringe electric field in the liquid crystal layer LC.

The transparent pixel electrode PIT is connected to the source electrode via a through-hole (not shown) formed in the first passivation film PAS1, the organic passivation layer OPAS and the second passivation film PAS2. With respect to the supply of the data voltage to the transparent pixel electrode PIT, when the on-voltage is applied to the gate line GL, the resistance of the semiconductor layer is lowered, and the data voltage is transmitted from the plurality of data lines DL through the source electrode to the transparent pixel electrode PIT. By applying a voltage to the pixel electrode PIT, a predetermined potential difference corresponding to the modulation of transmittance of the liquid crystal of a sub-pixel is imparted between the pixel electrode PIT and the common electrode CIT. The fringe electric field is generated in the vicinity of the openings in the pixel electrode PIT in the liquid crystal layer LC by the potential difference, so that an alignment state of the liquid crystal molecules is controlled so as to rotate the liquid crystal molecules in the substrate in-plane direction.

As shown in FIGS. 3-5, the plurality of common metal lines CM and the plurality of data lines DL extend in a same direction that is perpendicular to a direction extending from the TFT substrate SUB2 to the CF substrate SUB1 (i.e., they Direction) and that is perpendicular to the x Direction.

In the embodiments shown in FIGS. 3 and 4, the plurality of common metal lines CM is provided on the common electrode CIT.

In the embodiment shown in FIG. 5, the plurality of common metal lines CM is provided below the common electrode CIT and the plurality of data lines DL. The plurality of data lines DL are provided closer to the liquid crystal layer LC than the common metal lines CM. A third passivation layer PAS3 is formed between the common electrode CIT and the organic passivation layer OPAS. The third passivation layer PAS3 covers the plurality of data lines DL formed on the organic passivation layer OPAS.

The CF substrate SUB1 is a substrate assembly including a black matrix BM, a plurality of color filters CF, an overcoat layer OC and a second alignment layer AL2 stacked on a second glass substrate GS2. The plurality of color filters CF includes a plurality of red color filters CFr each of which corresponds to one of the plurality of red sub-pixels Pr, a plurality of green color filters CFg each of which corresponds to one of the plurality of green sub-pixels Pg, and a plurality of blue color filters CFb each of which corresponds to one of the plurality of blue sub-pixels Pb. The plurality of red color filters CFr is provided to allow a viewer to sense the color red from light transmitted therethrough. Similarly, the plurality of green color filters CFg is provided to allow a viewer to sense the color green from light transmitted therethrough and the plurality of blue color filters CFb is provided to allow a viewer to sense the color blue from light transmitted therethrough.

Each boundary between two adjacent sub-pixels (e.g., between a red sub-pixel Pr and a green sub-pixel Pg, between a green sub-pixel Pg and a blue sub-pixel Pb, and between a blue sub-pixel Pb and a red sub-pixel Pr, etc.) is defined by one of the plurality of data lines DL. A corresponding common metal line of the plurality of common metal lines CM is also provided at each boundary between two adjacent sub-pixels.

The CF substrate SUB1 also includes a plurality of black matrices BM provided at each boundary between adjacent sub-pixels. As shown in FIGS. 3-5, a black matrix BMrg is provided at a boundary between the red sub-pixel Pr and the green sub-pixel Pg, a black matrix BMgb is provided at a boundary between the green sub-pixel Pg and the blue sub-pixel Pb, and a black matrix BMbr is provided at a boundary between the blue sub-pixel Pb and the red sub-pixel Pr. Each of the black matrices BM is provided to block light from passing therethrough.

In FIGS. 3-5, f1 represents a center line, extending from the CF substrate SUB1 to the TFT substrate SUB2, of each of the plurality of common metal lines CM. Also, s1 represents a center line, extending from the CF substrate SUB1 to the TFT substrate SUB2, of each of the plurality of data lines DL. Further, c1 represents a center line, extending from the CF substrate SUB1 to the TFT substrate SUB2, of each of the plurality of color filters CF.

As shown in FIGS. 3 and 4, the plurality of common metal lines CM provided at the boundary between a green sub-pixel and an adjacent non-green sub-pixel (e.g., a red sub-pixel, a blue sub-pixel, etc.) are shifted towards the non-green sub-pixel. Thus, a first gap G1 is formed that defines a shortest distance between the centerline f1 and the centerline s1. Accordingly, each of the plurality of common metal lines CM provided at the boundary between a green sub-pixel and an adjacent non-green sub-pixel is positioned out of line with the corresponding data line DL.

In contrast, the plurality of common metal lines CM provided at the boundary between two adjacent non-green sub-pixels (e.g., between a red sub-pixel and a blue sub-pixel) are arranged to be approximately at a center of the boundary between the two adjacent non-green subpixels.

Thus, a second gap G2 is formed that defines a shortest distance between the centerline f1 and the centerline s1. Accordingly, each of the plurality of common metal lines CM provided at the boundary between two adjacent non-green sub-pixels is positioned approximately in line with the corresponding data line DL.

As the plurality of common metal lines CM provided at the boundary between a green sub-pixel and an adjacent non-green sub-pixel is shifted towards the non-green sub-pixel, the size of the first gap G1 is greater than the size of the second gap G2. In some embodiments, the size of the first gap G1 can be, for example, more than 1 micro meter and the size of the second gap G2 can be, for example, less than 1 micro meter.

Also, in the embodiments shown in FIGS. 3-5 each of the plurality of sub-pixels Pr, Pg, and Pb are approximately equal in width. A first distance D1 defines a shortest distance between the centerline c1 of a non-green sub-pixel and the centerline f1 of a common metal line CM provided between the non-green sub-pixel and an adjacent green sub-pixel. A second distance D2 defines a shortest distance between the centerline c1 of the green sub-pixel and the centerline f1 of the common metal line CM provided between the non-green sub-pixel and the adjacent green sub-pixel. As the plurality of common metal lines CM provided at the boundary between a green sub-pixel and an adjacent non-green sub-pixel (e.g., a red sub-pixel, a blue sub-pixel, etc.) are shifted towards the non-green sub-pixel, the distance D1 is less than the distance D2.

Further, as shown in FIGS. 3-5, a common metal line width W1 is illustrated that defines a distance from a first end of a common metal line CM to a second end of the common metal line CM in a direction extending from one sub-pixel to another sub-pixel and perpendicular to a direction extending from the CF substrate SUB1 to the TFT substrate SUB2. A data line width W2 is illustrated that defines a distance from a first end of a data line DL to a second end of the data line DL in a direction extending from one sub-pixel to another sub-pixel and perpendicular to a direction extending from the CF substrate SUB1 to the TFT substrate SUB2. In the embodiment shown in FIG. 3, the width W1 of each of the plurality of common metal lines CM is approximately equal to the width W2 of each of the plurality of data lines DL. In the embodiments shown in FIGS. 4 and 5, the width W1 of each of the plurality of common metal lines CM is greater than the width W2 of each of the plurality of data lines DL.

Advantages of providing a common metal line CM provided at a boundary between a green sub-pixel and a non-green sub-pixel at a position shifted towards the non-green sub-pixel is discussed below with respect to FIGS. 6A and 6B.

FIGS. 6A and 6B illustrate simplified schematics of how light can be transmitted through a portion of the display region PA, according to one embodiment. In particular, FIG. 6A illustrates the transmission of light at a boundary between a red sub-pixel and a green sub-pixel and FIG. 6B illustrates the transmission of light at a boundary between a red sub-pixel and a blue sub-pixel.

In FIGS. 6A and 6B, the display region PA includes the TFT substrate SUB2 located on a back surface side BSS, the CF substrate SUB1 located on the front surface side (display surface side) DSS and opposed to the TFT substrate SUB2, and the liquid crystal layer LC sandwiched between the TFT substrate SUB2 and the CF substrate SUB1. The CF substrate SUB1 includes the color filters CF and the black matrices BM. The TFT substrate SUB2 includes the pixel electrode PIT, the common electrode CIT, the plurality of common metal lines CM and the plurality of data lines DL. A backlight BL is provided at the back surface side BSS for transmitting light through the TFT substrate SUB2, the liquid crystal layer LC and through the CF substrate SUB1 for viewing by a viewer at the front surface side DSS. The embodiment shown in FIGS. 6A and 6B show the plurality of common metal lines CM having a width that is greater than the width of the data lines DL, similar to the embodiment shown in FIG. 4. It is appreciated that advantages of having the plurality of common metal lines CM positioned between a green sub-pixel and a non-green sub-pixel can be achieved when the width of the common metal lines CM and the width of the data lines DL are approximately equal, similar to the embodiment shown in FIG. 3.

FIG. 6A illustrates the transmission of light (indicated by the arrows) at the boundary between a red sub-pixel and a green sub-pixel. A human retina is unlikely to sense a color mixing of a green color image mixed with deviate red light. On the other hand, a human retina is more likely to sense a color mixing of a red color image mixed with deviate green light. As the common metal line CM is positioned to be shifted towards the red sub-pixel (as discussed above with respect to FIGS. 3 and 4) and not positioned in line with the data line DL at the boundary between the red sub-pixel and the green sub-pixel, more light rays transmitted from the backlight towards the green color filter CFg are blocked by the common metal line CM than light rays transmitted from the backlight BL towards the red color filter CFr. That is, more light rays transmitted through the green pixel in the TFT substrate are able to pass through the red color filter CFr than that of light rays transmitted through the red sub-pixel in the TFT substrate passing through the green color filter CFg. This is because the common metal line CM is shifted towards the red sub-pixel. Put another way, more light ray transmitted through the TFT substrate at the red sub-pixel are blocked by the common metal line CM than light rays transmitted through the TFT substrate at the green sub-pixel.

Accordingly, the configuration of the common metal line CM in FIG. 6A can reduce color mixing of a non-green light with another color light when the non-green color image is to be displayed. For example, when a red image is to be displayed (e.g., the red sub-pixel is operated in the ON state and the green sub-pixels and any other non-red sub-pixels are operated in the OFF state) more light rays transmitted from the backlight and directed toward the red color filter CFr can pass through the TFT substrate without being blocked by the common metal line CM than light rays transmitted from the backlight BL and directed toward the green color filter CFg due to the shifted position of the common metal line CM towards the red sub-pixel. Thus, when a red image is to be displayed, the display region PA can reduce the amount of color mixing of light passing through the green color filter CFg with the light passing through the red color filter CFr. The amount of color mixing can be particularly reduced when the display region PA is viewed at oblique angles.

FIG. 6B illustrates the transmission of light (indicated by the arrows) at the boundary between a blue sub-pixel and a red sub-pixel. As the common metal line CM is positioned in line with the data line DL at the boundary between the blue sub-pixel and the red sub-pixel, approximately the same amount of light rays transmitted from the backlight towards the blue color filter CFb and towards the red color filter CFr will be blocked by the common metal line CM. That is, an equal amount of light rays transmitted through the red sub-pixel in the TFT substrate passes through the blue color filter CFb as light rays transmitted through the blue sub-pixel in the TFT substrate passing through the red color filter CFr. A human retina is likely to sense a color mixing of a red color image mixed with deviate blue light as well as a color mixing of a blue color image mixed with deviate red light. This color mixing deteriorates the image quality of the liquid crystal display device. To prevent the image quality from deteriorating, a black matrix can be expanded wider, which can decrease an aperture ratio of the liquid crystal display device.

While FIG. 6A is discussed with respect to the boundary between the red sub-pixel and the green sub-pixel, it is appreciated that the discussion regarding the embodiments described herein can be extended to the boundary between any non-green sub-pixel and a green sub-pixel. Similarly, while FIG. 6B is discussed with respect to the boundary between the blue sub-pixel and the red sub-pixel, it is appreciated that the discussion regarding the embodiments described herein can be extended to the boundary between any first non-green sub-pixel and any second non-green sub-pixel.

With regard to the preceding description, it is to be understood that changes may be made in detail, especially in matters of the arrangement of parts without departing from the scope of the present disclosure. The word "embodiment" as used within this specification may, but does not necessarily, refer to the same embodiment. This specification and the embodiments described are exemplary only. Other and further embodiments may be devised without departing from the basic scope thereof, with the true scope and spirit of the disclosure being indicated by the claims that follow.

The invention claimed is:

1. A liquid crystal display, comprising:
   a first substrate on a back surface side, the first substrate including a plurality of first wirings and a plurality of second wirings extending in a same direction; and
   a second substrate on a display surface side, the first substrate and the second substrate being opposed to each other;
   a liquid crystal layer provided between the first substrate and the second substrate;
   a plurality of sub-pixels including one or more green sub-pixels and one or more non-green sub-pixels,
   wherein a boundary between two adjacent sub-pixels of the plurality of sub-pixels is defined by a corresponding second wiring of the plurality of second wirings,
   wherein a corresponding first wiring of the plurality of first wirings is provided at the boundary between the two adjacent sub-pixels,
   wherein a first gap defines a shortest distance from a centerline, extending from the first substrate to the second substrate, of a corresponding first wiring separating a green sub-pixel and an adjacent non-green sub-pixel to a centerline, extending from the first substrate to the second substrate, of a corresponding second wiring separating the green sub-pixel and the adjacent non-green sub-pixel,
   wherein a second gap defines a shortest distance from a centerline, extending from the first substrate to the second substrate, of a corresponding first wiring separating a first non-green sub-pixel and an adjacent second non-green sub-pixel to a centerline, extending from the first substrate to the second substrate, of a corresponding second wiring separating the first non-green sub-pixel and the adjacent second non-green sub-pixel,
   wherein the first gap is greater than the second gap,
   wherein the centerline of the corresponding first wiring separating the green sub-pixel and the adjacent non-green sub-pixel is closer to a centerline of the non-green sub-pixel than to a centerline of the adjacent green sub-pixel, and
   wherein the plurality of first wirings are provided between the plurality of second wirings and the second substrate.

2. The liquid crystal display of claim 1, wherein the plurality of non-green sub-pixels include a plurality of blue sub-pixels and a plurality of red sub-pixels.

3. The liquid crystal display of claim 1, wherein the plurality of first wirings are a plurality of data lines and the plurality of second wirings are a plurality of common metal lines.

4. The liquid crystal display of claim 1, wherein the plurality of first wirings are a plurality of common metal lines and the plurality of second wirings are a plurality of data lines.

5. The liquid crystal display of claim 1, wherein, for each of the plurality of first wirings, a first wiring width defines a distance from a first end of the first wiring to a second end of the first wiring in a second direction extending from a first sub-pixel to a second sub-pixel and perpendicular to the direction extending from the first substrate to the second substrate,
   wherein, for each of the plurality of second wirings, a second wiring width defines a distance from a first end of a second wiring to a second end of the second wiring in the second direction, and
   wherein the first wiring width is equal to the second wiring width.

6. The liquid crystal display of claim 1, wherein, for each of the plurality of first wirings, a first wiring width defines a distance from a first end of the first wiring to a second end of the first wiring in a second direction extending from a first sub-pixel to a second sub-pixel and perpendicular to the direction extending from the first substrate to the second substrate,
   wherein, for each of the plurality of second wirings, a second wiring width defines a distance from a first end of a second wiring to a second end of the second wiring in the second direction, and
   wherein the first wiring width is greater than the second wiring width.

* * * * *